A. HUPP.
SPRING SUPPORT FOR VEHICLES.
APPLICATION FILED NOV. 28, 1919.
1,390,560. Patented Sept. 13, 1921.
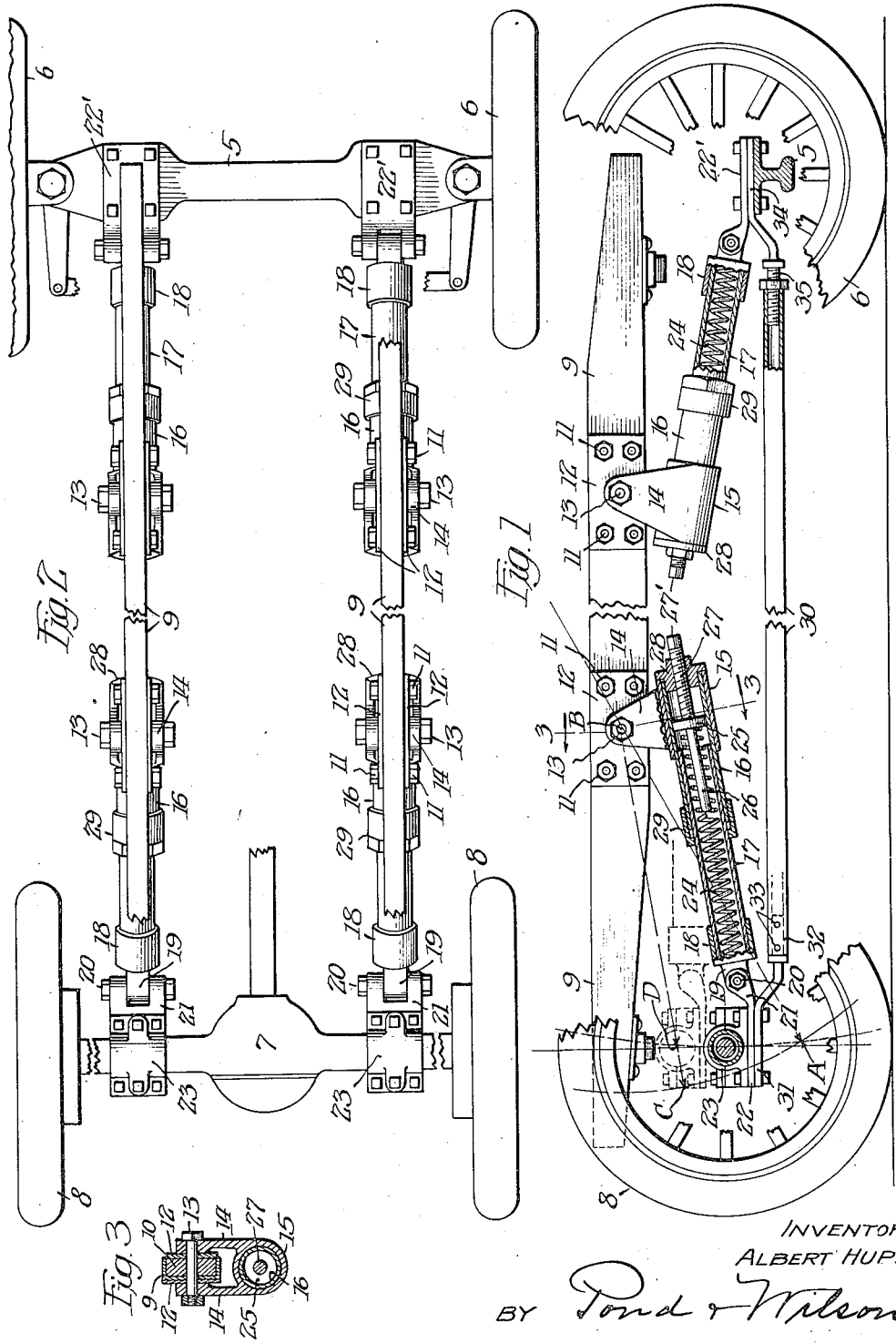
INVENTOR:
ALBERT HUPP,
BY Pond & Wilson,
ATTYS.

UNITED STATES PATENT OFFICE.

ALBERT HUPP, OF OAK PARK, ILLINOIS.

SPRING-SUPPORT FOR VEHICLES.

1,390,560.   Specification of Letters Patent.   Patented Sept. 13, 1921.

Application filed November 28, 1919. Serial No. 341,235.

*To all whom it may concern:*

Be it known that I, ALBERT HUPP, a citizen of the United States, residing at Oak Park, in the county of Cook and State of Illinois, have invented certain new and useful Improvements in Spring-Supports for Vehicles, of which the following is a specification.

This invention pertains to devices for elastically supporting the body of a vehicle upon its running gear, and has reference in its principal intended application to automobiles, motor trucks, and like vehicles, although adapted for advantageous use on carriages and wagons and other horse power vehicles.

The chief object sought to be attained by the present invention is the provision of an improved elastic body support of a kind and character such as to effectively cushion and absorb the shocks, jolts and vibrations transmitted to the running gear by the more or less rough and irregular surface of the road, and especially by holes, ruts and obstructions of considerable size in or on the road surface. Other important objects of the invention are; to provide a spring construction involving a compensating action between the load and the spring resistance; to provide a construction possessing a high degree of strength and rigidity in the running gear; to provide a construction which shall hold the four wheels of the running gear in more perfect alinement, thereby reducing wear on the tires, to provide a construction wherein the front and rear axles are tied together independently of the chassis frame and body of the vehicle; to provide a construction wherein the rising and falling movements of the wheels relatively to the body are confined to approximately perpendicular directions, thereby eliminating simultaneous angular movement of the wheels resulting from a rearward and forward displacement of each wheel from its normal running position when encountering an obstruction; to provide a construction wherein the points of support of the body on the running gear are located nearer the center of the body than at present, thereby reducing the length of wheel base otherwise necessary to obtain easy riding qualities.

Other objects and attendant advantages of the invention will be apparent to those skilled in the art from the following description, taken in connection with the accompanying drawing in which I have illustrated one practical embodiment of the principle of the invention, and wherein—

Figure 1 is a side elevation, partly broken out and in section of an automobile running gear and chassis frame embodying my present improvements;

Fig. 2 is a top plan view, partly broken away of the parts shown in Fig. 1; and

Fig. 3 is a cross-section on the line 3—3 of Fig. 1.

Generally described, the device of the present invention includes a pair of inclined, endwise compressible elastic supporting members on each side of the vehicle which at their inner ends are pivotally jointed to a side sill of the chassis frame and at their outer ends are pivotally jointed to the front and rear axles, and a reach rod or bar directly connecting and tying together the front and rear axles beneath said supporting members, said reach-rod or bar resisting the outward thrusts of the supporting members on the axles under the load, and also determining the paths of up and down movement of the axles and outer ends of said supporting members under road conditions. The device is essentially a floating toggle-lever arrangement with a pair of spaced knuckle-joints at which the load is applied, the lever-arms being contractible against spring pressure and the outer ends of said lever-arms being tied together by said reach-rod or bar, so that, as the lever-arms approach the horizontal, they are necessarily shortened, and each outer end of the toggle-lever travels in an arcuate path described by the adjacent end of the reach-rod from its opposite end as a center of movement.

Referring to the drawing for a specific description of the structure and arrangement of the parts of the device, 5 designates the front axle of an automobile on which are mounted as usual the front wheels 6, and 7 designates the rear axle bridge or housing carrying the usual differential gear and live axle sections (not shown) to the outer ends of which latter are secured the usual rear or traction wheels 8. The rectangular chassis frame is of the usual construction, including longitudinal side sills 9 preferably of customary channel shape, as shown in Fig. 3.

At some distance inwardly from each end of the side sill 9 there is fitted within the latter a hard-wood block 10, as a filler; and to opposite sides of the sill and block 10 are secured by bolts 11 flat metal plates 12. As shown in Fig. 3 through these plates 12, the vertical web of the side sill 9 and the filler block 10 is passed a pivot bolt 13, from which is suspended a hanger bracket 14 having at its lower end a tubular member 15, in which latter is tightly fitted a steel tube 16. Telescoping within the lower portion of the tube 16 is a longer steel tube 17, the lower end of which is tightly fitted into a cap-piece 18 that is formed at its outer end with a hinge-lug 19 connected by pivot bolt 20 to a similar pivot lug 21 formed on a shackle plate or bracket 22 that is bolted to the lower side of a split collar 23 surrounding the axle bridge or casing 7. Housed within the telescoping tubular members 16 and 17 is a long powerful coil compression spring 24, the lower end of which abuts against the transverse wall of the cap 18, while its upper end bears against an adjustable abutment in the form of a plunger disk 25 slidably fitting the outer tubular member 16. This disk 25 is preferably provided with a mandrel 26 forming a core-piece or centering pin for the upper end portion of the spring 24 which projects more or less into the outer tubular member 16. On the opposite side of the disk 25 is a threaded stem 27 that passes through a threaded hole in an end piece or cap 28 formed integral with or strongly secured to the outer end of the tubular member 15 of the suspension bracket 14. The outer end of the stem 27 is squared, as shown at 27', by which the tension of the spring 24 may be increased or decreased, as desired, according to load and road conditions.

To the lower end of the outer tubular member 16 is applied a gasket 29 for the exclusion of dust and dirt from the interior of the spring chamber which, in practice, is packed with oil or grease to reduce friction between the outer and inner telescoping members and between the inner telescoping member and the spring.

The disclosed structure and arrangement of hanger and telescoping spring support is duplicated at the front end of the vehicle, as shown at the right in Fig. 1, but in this case the shackle plate or bracket 22' is preferably bolted directly to the front axle 5.

30 designates a long tie-rod, preferably of steel tubing, which is employed to rigidly connect the front and rear axles substantially in the vertical plane of the elastic supports, and resist the powerful outward thrusts of the latter upon the axles, as well as to fix the arcuate path of up and down movement of the axle and outer end of the compressible support. To the lower side of the collar 23 on the rear axle housing is secured, preferably by the same fastening bolts that secure the shackle bracket 22 thereto, a bracket plate 31 carrying a forwardly extending mandrel 32 that fits into the rear end of the tubular rod 30 and may be united thereto by cross pins or bolts 33. Similarly secured to the front axle 5 by the same bolts which secure the shackle bracket 22' thereto is a flat bracket 34 that is formed with a threaded mandrel 35 that enters the tapped forward end of the tie-rod 30, this threaded connection permitting accurate adjustment of the total length of the tie-rod or reach to the distance between the front and rear axles.

It will be understood that the described construction exists on both sides of the chassis frame, so that the latter is supported at four points coincident with the pivot bolts 13 at considerable distance inwardly from the front and rear ends of the said frame.

Briefly describing the operation and assuming that the full line position of the parts shown in the drawing represents their normal position when the vehicle is at rest under an average load, the springs 24 are, of course, under considerable compression and the tie-rods 30 under considerable tension. The length and strength of the spring 24 are such that if the load were entirely removed so that the spring could elongate the tubular supporting member to its maximum limit, the center axis of the rear axle would be at the point A, and the radius of swing of the supporting member would be measured by the line A—B. The arc of swing of the support on the radius A—B is shown by the line A—C. The arc of swing of the tie-rod 30 at the rear end of the vehicle is shown by the line A—D. This is very nearly coincident with a vertical line through the axis of the rear axle in the full line position of the latter, the points A and D lying about a quarter of an inch inwardly of said vertical line at the extreme lower and upper points A and D of movement of the axle in a life size construction. Since the rear axle is not free to move up and down in a path parallel with the arc A—C of the fully extended spring support, but must travel up and down in the path of the arc A—D, it follows that under a relative movement of the axle and body toward each other, the spring is compressed. The greatest contraction of the spring occurs during the travel from the point A to the position shown in full lines, while the remaining contraction occurs during the travel from the point shown in full lines to the point D, at which the parts are indicated in dotted lines, the spring support being then substantially horizontal and the spring under its maximum compression. In practice the total rise and fall of the axle may be as much as 13 inches, which is far in excess of the extent of up and down vibration of the axles relatively to the body permitted by present known and standard spring constructions, thus securing much easier riding qualities.

Among the mechanical advantages presented by the described construction may be mentioned the following:

First. Since the elastic supporting arms lie in positions more or less closely approaching the horizontal, depending upon the load, and, under relative movements of the axles and body toward each other are constantly approaching the horizontal position, the thrusts are mainly in directions lengthwise of the body, thereby greatly lessening the vertical or upward thrusts as compared with the elliptic and semi-elliptic spring constructions now in use.

Second. The up and down movements of the axles are held nearly vertical by reason of the action of the tension or tie-rods, thereby reducing lateral distortion strains on both the axles and the wheels.

Third. The spring tension may be readily adjusted according to the load to be carried, by the simple application of a wrench to the squared ends of the adjustable spring abutments.

Fourth. A compensating action exists between the spring resistance and the load, due to the fact that the spring compressing force increases as the spring approaches the horizontal position under the toggle-lever action in substantially the same degree that the spring resistance increases, thus making the resultant elastic resistance substantially constant and uniform throughout the full extent of up and down movement of the wheel and axle relatively to the body.

Fifth. The tie-rods serve not only as a means to render effective the extensile and contractile supporting members by opposing their outward thrusts and fixing their paths of swing, and to limit the vibrations of the axles to substantially vertical directions thereby preserving the alinement and tracking of the wheels, but they also, by positively tying together the ends of the front and rear axles, contribute to the production of a substantially rigid wheel-carrying frame, wherein oblique thrusts against either the front or rear wheels and axles are in a measure distributed to and resisted by the others.

Sixth. Still another advantage of the tie-rods lies in the fact that they act to maintain the rear axle bridge or housing rigid against any bending strains caused by the action of the transmission shaft and differential gearing, or other causes, thus insuring the perfect alinement and easy running of the rear axle-shafts.

Seventh. The described construction does away with the necessity of the usual torsion rods running from the axle to the frame, and which transmit wheel jolts to the latter. With the described construction vibrations of the running gear of whatever kind are transmittable to the body only through the four springs, which in practice may be thirty inches in length with a maximum compression of six inches; and these vibrations are practically all absorbed, so that the body of the vehicle rides easily and smoothly and with but slight vertical vibration on the roughest roads. It is believed that the device of my present invention will largely do away with the necessity of pneumatic tires for passenger vehicles and with solid rubber tires for trucks, as well as requiring less power from the engine to overcome the obstacles presented by rough and uneven road surfaces.

It will be manifest to those skilled in the art that the broad underlying principle of this invention is capable of practical embodiment in structures differing specifically from that herein shown and described.

Hence, it should be understood that I do not limit the invention to the particular embodiment selected for purposes of illustration, but reserve all such variations and modifications as fall within the spirit and purview of the appended claims.

I claim—

1. In a spring support for vehicles, the combination with a body supporting member, and front and rear axles, of a toggle-lever support between said member and said axles, the toggle-arms of said support being elastically compressible endwise, and means connecting said axles and opposing the outward thrust of the toggle-arms.

2. In a spring support for vehicles, the combination with a body supporting member, and front and rear axles, of a pair of endwise elastically compressible toggle-lever arms pivoted at their inner ends to said body supporting member and at their outer ends connected to said front and rear axles respectively, and a tension rod or bar connecting said axles and opposing the outward thrust of said toggle-arms.

3. In a spring support for vehicles, the combination with a side sill of a chassis frame, and front and rear axles, of a pair of endwise elastically compressible toggle-arms independently pivoted at their inner ends to said side sill and at their outer ends connected to said front and rear axles respectively, and a tension rod or bar rigidly connecting said axles.

4. In a spring support for vehicles, the combination with a side sill of a chassis frame, and front and rear axles, of a pair of endwise elastically compressible toggle-arms pivoted in spaced relation at their inner ends to said side sill and at their outer ends pivotally jointed to said front and rear axles respectively, and a tension rod or bar rigidly connecting said axles.

5. In a spring support for vehicles, the combination with a side sill of a chassis frame, and front and rear axles, of a pair of endwise elastically compressible toggle-arms pivoted in spaced relation at their inner ends to said side sill and at their outer ends pivotally jointed to said front and rear axles respectively, and a tension rod or bar rigidly connecting said axles and lying substantially in the vertical plane of said toggle-arms.

6. In a spring support for vehicles, the combination with a side sill of a chassis frame, and front and rear axles, of a pair of endwise elastically compressible toggle-arms pivoted in spaced relation at their inner ends to said side sill and at their outer ends pivotally jointed to said front and rear axles respectively, and a longitudinally adjustable tension rod or bar rigidly connecting said axles beneath and substantially in the vertical plane of said toggle-arms.

7. In a spring support for vehicles, the combination with a side sill of a chassis frame, and front and rear axles, of a pair of toggle-arms pivoted in spaced relation at their inner ends to said side sills and at their outer ends pivotally jointed to said front and rear axles respectively, each of said toggle-arms including telescoping tubular members and a compression spring housed within said tubular members, and means rigidly connecting said front and rear axles and opposing the outward thrusts of said toggle-arms.

8. In a spring support for vehicles, the combination with a side sill of a chassis frame, and front and rear axles, of a pair of toggle-arms pivoted in spaced relation at their inner ends to said side sill and at their outer ends pivotally jointed to said front and rear axles, respectively, each of said toggle arms including telescoping tubular members and a compression spring housed within said tubular members, means for adjusting the tension of said spring, and means rigidly connecting said front and rear axles and opposing the outward thrusts of said toggle-arms.

9. In a spring support for vehicles, the combination with a side sill of a chassis frame, and front and rear axles, of front and rear supporting devices for said side sill each comprising a hanger bracket pivotally suspended at its upper end from said side sill, a tubular member rigid with said bracket, a second tubular member telescopingly engaged with said first named tubular member and pivotally jointed at its outer end to one of said axles, a compression spring housed within said tubular members, and a tie-rod connecting said front and rear axles substantially in the vertical plane of said supporting devices.

10. In a spring support for vehicles, the combination with a side sill of a chassis frame, and front and rear axles, of front and rear supporting devices for said side sill each comprising a hanger bracket pivotally suspended at its upper end from said side sill, a tubular member rigid with said bracket, a second tubular member telescopingly engaged with said first named tubular member and pivotally jointed at its outer end to one of said axles, a coil compression spring housed within said tubular members, an adjustable abutment member for one end of said spring mounted in the outer end of one of said tubular members, and a tie-rod connecting said front and rear axles substantially in the vertical plane of said supporting devices.

11. In a vehicle spring of the character described, the combination with a chassis side sill of channel form, of a wooden filler block fitted in said sill, metal side plates secured to the outer sides of said sill and filler block respectively, a pivot bolt passed transversely through said sill, filler block and side plates, and a hanger bracket for a spring element suspended from said pivot bolt.

12. The combination with front and rear axles of a vehicle, of tie-rods rigidly connecting said axles on either side of the vehicle, a body supporting member, and inclined endwise compressible elastic supporting members each pivotally jointed at its upper end to said body supporting member and at its lower end to one of said axles, said elastic supporting members on each side of the vehicle lying above and substantially in the vertical plane of one of said tie-rods.

ALBERT HUPP.